United States Patent Office 2,931,068
Patented Apr. 5, 1960

2,931,068

PROCESS FOR ELONGATING A SYNTHETIC RESIN STRUCTURE

Robert E. Kitson and Cecil E. Reese, Kinston, N.C., assignors to E. I. du Pont de Nemours and Company, Wilmington, Del., a corporation of Delaware No Drawing. Application February 28, 1958
Serial No. 718,113

2 Claims. (Cl. 18—48)

This invention relates to a novel process in which certain polyester structures are caused to undergo a spontaneous and irreversible extension in length. This application is a continuation-in-part of our copending application Serial No. 648,783, filed March 27, 1957, now abandoned.

Filaments and films composed of linear terephthalate polyesters, such as polyethylene terephthalate, have achieved wide commercial acceptability owing to their high tenacity and to their resistance to attack by chemicals and by insects, as well as to other desirable factors. One characteristic which has always been regarded as inherent in linear terephthalate polyester fibers and films, in common with fibers and films of other synthetic or natural polymers, is their tendency to shrink when heated, i.e., to undergo spontaneous and irreversible retraction in length. Therefore, it has not been anticipated that linear terephthalate polyesters could be caused to undergo spontaneous and irreversible extension in length upon heating.

It is an object of this invention to provide a process for causing linear terephthalate polyester structures having a longitudinal axis to undergo spontaneous and irreversible extension in length in the direction of said axis. Another object is to provide a process whereby such structures are caused to undergo spontaneous and irreversible extension in length in at least two stages. Other objects will become apparent in the following description and claims.

It has now been found that a linear terephthalate polyester structure having a longitudinal axis and being characterized by a crystallinity of not more than about 50%, said structure having been produced by heating an initial linear terephthalate polyester structure having a longitudinal axis and exhibiting an initial birefringence of at least about 0.04 until the initial structure shrinks between about 20% and about 70% in the direction of said axis, may be caused to undergo spontaneous and irreversible extension in length along said axis by heating it at a temperature sufficient to cause an increase in crystallinity in said structure, said temperature being at least about 70° C.

An important characteristic of the increase in length of a polyester structure along its longitudinal axis when it is heated in accordance with the present invention is that the increase in length is irreversible; that is, the structure does not return to its original length when it is cooled, or when it is dried if a liquid has been used in the heating step. Another important characteristic of the increase in length is that it occurs spontaneously; that is, when the polyester structure is heated in accordance with the invention, the increase in length occurs without any tension being applied to the ends of the structure. The amount of spontaneous extension in length which is achieved may be quite small, i.e., about 1% or less, or it may range up to 30% or higher, the amount depending upon the heating conditions to which the structure is subjected to bring about the spontaneous extension in length, as well as upon the character of the structure itself. When the structure is heated at an elevated temperature, the amount of spontaneous and irreversible extension in length which is obtained is greater than the amount observed by heating the same structure at a lower temperature in the same medium. The structures which may be caused to undergo spontaneous extension in length in accordance with the process of the present invention are stable at room temperature, so that the process of the invention need not be carried out within a limited time after the structures are prepared. In fact, in commercial practice it will usually be desired to bring about the step of spontaneous extension in length only after the polyester structure has been subjected to various intermediate manufacturing processes.

The novel process of the invention is useful for a variety of purposes. For example, yarns which may be caused to undergo spontaneous extension in length in accordance with the process of the present invention may be used as sewing threads, and after a seam has been sewn with them the process of the invention may be carried out to provide a seam in which puckering is substantially eliminated. Filaments spontaneously extensible in accordance with process of the present invention may be plied with filaments which have a degree of residual shrinkage, following which the plied yarn may be heated in accordance with the process of the invention to provide a novel yarn having a permanent high degree of bulk. Such yarns are highly desired for preparation of cotton-like fabrics.

In the process of the invention described as above, the temperature at which the process is carried out may be higher than, equal to, or lower than the temperature at which the shrinking step was carried out in the preparation of the structure. It is required, however, that the temperature at which the process of the invention is carried out be sufficiently high to cause an increase in crystallinity in the polyester structure. Obviously, if the initial polyester structure is shrunk in such a way that the polyester reaches the maximum crystallinity level achievable in it at the temperature and in the medium employed to shrink it, the process of the invention must be carried out under conditions in which a higher degree of crystallinity is achieved, which usually will require a higher temperature. When a high degree of spontaneous extension in length is desired in the process of the invention, the spontaneously extensible polyester structure is advantageously produced in accordance with one of the preferred embodiments defined below.

In preparing products which may be caused to undergo spontaneous extension in length in accordance with the process of the invention, it is necessary to begin with linear terephthalate structures having a minimum birefringence of 0.04. For example, a structure oriented to a birefringence of 0.04 in the extrusion step by winding it at about 3000 yds./min. or higher may be used. However, in the case of structures oriented by drawing them, a birefringence of about 0.15 is usually required for the preparation of products which may be caused to undergo spontaneous extension in length in accordance with the process of the invention. As indicated above, it is necessary that the initial structures be heated until they shrink between about 20% and 70%. A minimum temperature of about 65° C. is required to bring about the required shrinkage, although higher temperatures may be necessary, depending upon the orientation, crystallinity, and other properties of the structure. Following the shrinkage step, the polyester structure may be caused to undergo spontaneous extension in length in accordance with the process of the invention.

One preferred embodiment of the process of the invention comprises heating, at a temperature sufficient to cause an increase in crystallinity, a linear terephthalate polyester structure which has been prepared by heating an initial linear terephthalate polyester structure having a longitudinal axis and characterized by a crystallinity less than 10% and a birefringence greater than about 0.04 in an inert liquid maintained at a temperature below about 88° C. until the initial structure shrinks between about 20% and 70% along said axis. The process of the invention, in which spontaneous extension in length of the polyester structure is obtained, is usually carried out at a temperature of at least about 90° C. in water, or at a somewhat higher temperature in air, although temperatures as low as about 70° C. in water may sometimes be used. By employing temperatures in the range of 200° C. spontaneous extension in length ranging up to as high as about 30% or higher may be obtained in this embodiment of the invention.

Another preferred embodiment of the process of the invention comprises heating, at a temperature sufficient to cause an increase in crystallinity, a linear terephthalate polyester structure which has been prepared by (A) heating an initial linear terephthalate polyester structure having a longitudinal axis and characterized by a crystallinity less than about 35% and a birefringence greater than about 0.04 by passing said initial structure through a zone maintained at a temperature of at least about 90° C., said initial structure undergoing a shrinkage between about 20% and about 70%, and (B) cooling the shrunk structure before its crystallinity reaches the maximum crystallinity level achievable in said zone. In this embodiment also the amount of spontaneous extension in length which is achieved may be very high.

Frequently, in working with a polyester structure which may be caused to undergo spontaneous extension in length in accordance with the process of the present invention, it is desired to subject the structure to intermediate steps in which the use of heat is required, but before it is desired to exploit the phenomenon of spontaneous extensibility. For example, in working with a spontaneously extensible sewing thread, it is frequently desired to dye the thread before it is used to sew a garment; and this normally requires the use of an aqueous dye bath at a temperature of at least 100° C. Accordingly, it might be assumed that the utility of the invention is restricted to those occasions in which no preliminary treating step involving heat is required. Surprisingly, this is not the case, since it has been found that the phenomenon of spontaneous extensibility can be achieved in two or more stages.

In a highly preferred embodiment of the invention, a spontaneously extensible linear terephthalate polyester structure having a longitudinal axis is heated at a temperature sufficient to cause an increase in crystallinity in the structure whereby the structure is caused to undergo spontaneous and irreversible extension in length along said axis, following which the structure is heated again at a temperature sufficient to induce further crystallization in the structure whereby the structure is caused to undergo a second spontaneous and irreversible extension in length along said axis. The process may be repeated until no further increase in the crystallinity of the structure can be achieved.

To facilitate an understanding of the invention, reference should be made to the following definitions and explanations of terms, it being understood that these terms, whenever employed herein in the description and claims, are to be construed in accordance with such definitions and explanations.

The intrinsic viscosity of the polymer is used herein as a measure of the degree of polymerization of the polymer and may be defined as:

$$\text{limit } \frac{\ln \eta_r}{C} \text{ as C approaches 0}$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent.

The expression "structures having a longitudinal axis" is used herein to denote shaped articles of polymers in which at least one dimension of the structure is relatively quite large and at least one dimension of the structure is relatively quite small. The expression therefore comprehends ribbons and films as well as filaments and fibers.

The birefringence, or double refraction, of a polymeric structure having a longitudinal axis is primarily dependent upon the orientation of the polymer molecules along the longitudinal axis and is a convenient measure of such orientation. The birefringence, which is also called the specific index of birefringence, may be measured by the retardation technique described in "Fibers From Synthetic Polymers" by R. Hill (Elsevier Publishing Company, New York, 1953) pages 266–8, using a polarizing microscope with rotatable stage together with a cap analyzer and quartz wedge. The birefringence is calculated by dividing the measured retardation by the measured thickness of the structure, expressed in the same units as the retardation.

A high degree of orientation may be induced in a linear terephthalate polyester structure by drawing it after it is spun or extruded, as disclosed by Whinfield and Dickson in their United States Patent 2,465,319. Instead of orienting the structure by drawing it in a separate step, orientation may be achieved simply by winding the extruded structure at a very high rate of speed. For example, when molten polyethylene terephthalate is spun and wound up as 1.4 denier filaments at 3000 yds./min. (yarn intrinsic viscosity 0.58), a birefringence of 0.04 is observed. Somewhat higher winding speeds are required to achieve the same birefringence level in filaments of higher denier.

In addition to the orientation which may be induced in linear terephthalate polyester structures, the polyesters may also be made to undergo crystallization. It is difficult to measure the crystallinity of linear terephthalate polyesters with great precision; however, there are several convenient methods for estimating the percentage crystallinity of linear terephthalate polyesters within a few percent, a sufficient approximation for the purpose of the present invention. One such method involves the application of X-ray diffraction techniques. The X-ray diffraction pattern of the linear terephthalate polyester sample is prepared by standard film techniques, using a vacuum camera, and an equitorial densitometer scan (perpendicular to the longitudinal axis of the structure) of the pattern is made. As is well known, the resulting curve exhibits three peaks, corresponding to the scattering from the 010, $\bar{1}$10, and 100 diffraction planes, which represent the principal scattering from linear terephthalate polyester crystallites. To estimate the crystallinity of the sample, a straight line is drawn underneath the 010 peak and tangent to the curve on either side of the 010 peak, one of the tangent points being in the vicinity of the minimum between the 010 and $\bar{1}$10 peaks and the second tangent point being on the other side of the 010 peak on the curve approaching the beam stop. A perpendicular is then dropped from the highest point of the 010 peak to the axis. The height of the point of intersection between this perpendicular line and the line tangent to the curve is then designated as $I_a$, representing the intensity of the amorphous background. The height of the highest point of the 010 peak itself is designated as $I_c$. Crystallinity is then estimated by the following formula:

$$\text{Percent crystallinity} = \frac{I_c - I_a}{I_c} \times 100\%$$

The amount of crystallinity which may be induced in a linear terephthalate polyester varies over a wide range depending upon the conditions to which the polyester is subjected. A sample of molten polyester which is cooled quite quickly to room temperature exhibits no crystallinity at all when it is tested in accordance with the technique described above; such a polyester is said to be amorphous. When a sample of the polyester is heated at 200° C. or above the polyester may achieve a crystallinity as high as 75%. At temperatures intermediate between room temperature and 200° C. the polyester will reach intermediate degrees of crystallinity. The medium in which the heating is carried out will also affect the degree of crystallinity achieved.

The "maximum crystallinity level achievable" in a linear terephthalate polyester structure at a given temperature in a given medium is defined as the highest degree of crystallinity which may be induced among the polymer molecules within the structure at the given temperature in the given medium. Although a finite time is required for crystallization to take place in the polyester the maximum crystallinity level achievable in the polyester is approached rather quickly, the required time being progressively shorter at progressively higher temperatures. Thus, the maximum crystallinity achievable in an oriented polyester is substantially reached within less than about a minute in water at 100° and within less than 5 seconds in air at 150° C. Longer exposures of the polyester in the same medium at the same temperature will induce only relatively slight further crystallization, if any.

The value of the maximum crystallinity level achievable will vary slightly for different samples of linear terephthalate polyester structures at any given temperature in any given medium, since the amount of crystallization which may occur within individual samples varies to some extent depending upon such factors as the orientation of the structure. However, for any particular linear terephthalate polyester structure the maximum crystallinity level achievable at a given temperature in a given medium is easily ascertained by exposing the structure to the given medium at the given temperature for varying time periods until a constant or maximum crystallinity level is reached. At temperatures above the melting point of the polyester the crystallinity will quickly rise to a maximum level and then fall off again within a time period usually less than one second.

By "linear terephthalate polyester" is meant a linear polyester in which at least about 85% of the recurring structural units are units of the formula

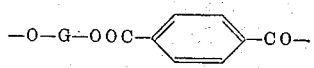

wherein —G— represents a divalent organic radical containing from 2 to 10 carbon atoms and attached to the adjacent oxygen atoms by saturated carbon atoms. Thus, the radical —G— may be of the form —CH$_2$—A$_m$CH$_2$—, where $m$ is 0 or 1 and A represents an alkylene radical, a cycloalkylene radical, a bis-alkylene ether radical, or other suitable organic radical. The linear terephthalate polyesters may be prepared by reacting terephthalic acid or an ester-forming derivative thereof with a glycol, G(OH)$_2$, where —G— is a radical as defined above, to form the bis-glycol ester of terephthalic acid, followed by polycondensation at elevated temperature and reduced pressure with elimination of excess glycol. Examples of suitable glycols include ethylene glycol, diethylene glycol, butylene glycol, decamethylene gycol, and trans-bis-1,4-(hydroxymethyl)-cyclohexane (hereinafter designated as trans-p-hexahydroxylylene glycol). In a preferred embodiment of the invention, the radical —G— is the ethylene radical, —CH$_2$CH$_2$—; that is, the products are prepared from structures of polyethylene terephthalate or copolyesters thereof. In another preferred embodiment of the invention, the products are prepared from structures of poly(trans-p-hexahydroxylylene terephthalate) or copolyesters thereof; i.e., the polyesters comprise at least about 85% recurring structural units of the formula

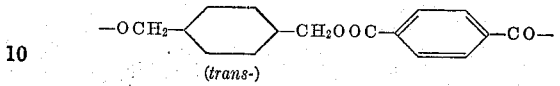
(trans-)

Mixtures of the glycols as defined may suitably be used to form copolyesters, or small amounts, e.g., up to about 15 mol percent, of a higher glycol may be used, such as a polyethylene glycol. Similarly, copolyesters may be formed by replacing up to about 15 mol percent of the terephthalic acid or derivative thereof with another dicarboxylic acid or ester-forming derivative thereof, such as adipic acid, dimethyl sebacate, isophthalic acid, or sodium 3,5 - dicarbomethoxybenzenesulfonate. Linear terephthalate polyesters and copolyesters, especially polyethylene terephthalate polyesters and copolyesters, can readily be prepared in an oriented, relatively amorphous or non-crystalline form.

The following examples will serve to illustrate the invention, although they are not intended to be limitative. In each case the preparation of the spontaneously extensible polyester structure from the polymer itself is also described. Polyethylene terephthalate is prepared in accordance with the general procedure described in United States Patent 2,465,319 to Whinfield and Dickson, in which dimethyl terephthalate (1 mol) and ethylene glycol (about 2.1 mols) are heated together in the presence of a catalyst until the evolution of methanol ceases, following which the mixture is heated at an elevated temperature and reduced pressure with evolution of glycol until polyethylene terephthalate having the desired intrinsic viscosity is attained. Copolyesters of polyethylene therephthalate are prepared by substituting for a portion of the dimethyl terephthalate an equivalent portion of another dicarboxylic ester; thus polyethylene terephthalate/isophthalate (90/10) is prepared from a mixture of 0.90 mol of dimethyl terephthalate, 0.10 mol of dimethyl isophthalate, and about 2.1 mols of the ethylene glycol.

*Example 1*

Polyethylene terephthalate having an intrinsic viscosity of 0.57 is spun at 295° C. through a spinneret having 34 orifices, each 0.009 inch in diameter, and the yarn is wound up at a speed of 3775 yds./min. The resulting yarn is tenacious as spun, as described by Hebeler in his United States Patent 2,604,689. The yarn is found to have a denier as spun of 120, a birefringence of 0.0440, and a crystallinity level of 0% (substantially amorphous). A 42.0 cm. length of the yarn is then immersed in a bath of water maintained at a temperature of 70° C. for 5 minutes. When the yarn is removed from the water, its length is found to be only 21.0 cm., corresponding to a shrinkage of 50%. After this first heat treatment the birefringence of the yarn is found to be 0.0110 and the crystallinity is found to be about 1%. A 21.0 cm. length of the heat-treated yarn is then subjected to a second heat treatment by immersing it, free of tension, in a bath of water maintained at a temperature of 90° C. for 5 minutes, after which its new length is found to be 23.5 cm., corresponding to an 11.9% spontaneous and irreversible extension in the length of the yarn during the second heat treatment, based on its measured length prior to the second heat treatment.

When a 21.0 cm. length of the heat-treated yarn is subjected to a second heat treatment for 5 minutes in water at 100° C. instead of 90° C., its new length is found to be 23.9 cm., corresponding to a spontaneous and irreversible extension in length of 13.8%.

Another sample of the spun yarn is subjected to a first heat treatment by immersion for 5 minutes in a bath of water maintained at a temperature of 65° C., whereupon the yarn shrinks 54.5%. Samples of the resulting heat-treated yarn undergo spontaneous and irreversible extension in length amounting to 3.8% and 5.0%, respectively, in 90° C. water and in 100° C. water (5 minute immersion).

Still another sample of the spun yarn is dipped in water at 100° C. for an exposure time approximating 1 second, whereupon the yarn shrinks 60%. The birefringence of the yarn is found to be 0.0114 and its crystallinity is found to be 15%. A sample of the heat-treated yarn undergoes a spontaneous and irreversible extension in length of 8.6% in water at 90° C. within 5 minutes. The same sample, when heated in 200° C. air for 5 minutes, undergoes a further spontaneous extension in length of 6.1%, based on the length of the yarn after its exposure to water at 90° C.

*Example 2*

Polyethylene terephthalate having an intrinsic viscosity of 0.57 is spun at 295° C. through a spinneret having 27 orifices, each 0.009 inch in diameter, and the yarn is wound up at a speed of 1200 yds./min. The yarn is found to have a denier as spun of 135, a birefringence of 0.0094, and a crystallinity level of 0% (substantially amorphous). In an experiment recorded as the first entry in Table I, the yarn is passed from a feed roll through a bath of water maintained at 20° C. to a draw roll, after which it is wound up on a suitable package. The yarn speed at the draw roll is 400 yds./min. In the experiments recorded in the other entries in Table I, the yarn is passed from a supply package through a bath of water at 25° C. and over a sponge to leave a thin uniform film of water on the yarn, after which is is passed around a feed roll, around a draw pin 1.6 inches in diameter maintained at a temperature of 100° C., and then around a draw roll, finally being wound up on a suitable package. The speed at the draw roll is 545 yds./min. The yarn is drawn at various draw ratios, as indicated in the table, and the birefringence of the drawn yarn is listed in the table. The crystallinity of the drawn yarns is 0% except in the first entry in the table, in which case the crystallinity is 5%. In each case the drawn yarn is subjected to a heat treatment in water. In entries 1, 2, and 3 the temperature is 70° C. and the shrinkage time is 5 mins. In entry 4 the temperature is 100° C. and the shrinkage time is 0.1 second, and in entry 5 the temperature is 100° C. and the shrinkage time is 5 mins. The shrinkage of the yarn during this heat treatment is also recorded, as well as crystallinity of the treated yarn and in some cases the birefringence of the treated yarn. The yarn products prepared as indicated are then caused to undergo spontaneous and irreversible extension in length in one or more stages by heating them in successive steps at the temperatures and in the media indicated in the table. The percentage figures for spontaneous extension in length listed in the table are cumulative percentages, based in each case on the cumulative change in length of the yarn as compared with the length of the yarn product after the shrinkage step.

*Example 3*

A quantity of the spun polyethylene terephthalate yarn of Example 2 is passed through water, over a sponge, and drawn over a 100° C. pin as described in the example, the draw ratio being 2.937. The drawn yarn has a birefringence of 0.2025 and a crystallinity level of 0% (substantially amorphous). The drawn yarn is then passed continuously from a feed roll through a 12-inch chamber containing steam maintained at 100° C. to a suitable windup package, the rate of feed being 380 yds./min. and the rate of winding being 150 yds./min., corresponding to a shrinkage of 60.5% and an exposure time of approximately 0.13 second, based on the rate of withdrawal of the yarn from the chamber. The steam-treated yarn has a birefringence of 0.0280 and a crystallinity level of 23%. Samples of the yarn undergo spontaneous extension in length amounting to 15.0%, 17.2%, and 29.2% when they are subjected for 5 minutes to 90° C. water, 100° C. water, and 200° C. air, respectively. A single sample of the steam-treated yarn, when heated successively in 90° C. water, 100° C. water, and 200° C. air (5 minutes each), undergoes cumulative spontaneous growth amounting to the same percentage figure at each stage as in the corresponding single-stage heating step, i.e. 15.0%, 17.2%, and 29.2%, respectively.

*Example 4*

A quantity of the spun polyethylene terephthalate yarn of Example 2 is passed through water, over a sponge, and drawn over a 100° C. pin as described in the example, the draw ratio being 3.395. The drawn yarn is found to have a birefringence of 0.2259 and a crystallinity of 8%. The drawn yarn is passed from a feed roll through a hollow needle leading into a nozzle having a throat diameter of 0.062 inch and a 7° flared exit passage and thence to a suitable wind-up package. Air is maintained at 250° C. and 5 p.s.i. pressure on the entrance side of the nozzle, so that a jet of hot air is caused to flow through the nozzle in the same direction as the yarn is passed through the nozzle. The tip of the hollow needle from which the yarn is delivered is located within the throat of the nozzle and the effective distance through which the yarn is heated is 1.35 inch. The yarn is passed into the nozzle at 804 yds./min. and wound up at 450 yds./min., corresponding to a shrinkage of 44% and an exposure time of 0.005 second, based on the rate of withdrawal of the yarn from the nozzle. The heat-treated yarn has a birefringence of 0.1425 and a crystallinity of 38%. Samples of the yarn undergo spontaneous extension in length amounting to 2.3% and 4.0% when they are heated in water at 90° C. and 100° C., respectively (5 minute exposure).

In another experiment, a quantity of the spun yarn of Example 2 is passed from a feed roll around a 1.6-inch pin maintained at 98° C. to a draw roll and subsequently wound up in a suitable package. The applied draw ratio is 3.353, and the yarn speed at the draw roll is 604 yds./min. The yarn is not contacted with water during this drawing operation. The drawn yarn has a birefringence of 0.2270 and a crystallinity level of 33%. The

TABLE

| | Draw Ratio | Drawn Yarn, Biref. | Shrinkage, percent | Properties of Yarn Product (After Shrinking) | | Cumulative Spontaneous Extension In Length—5 Minute Heating Steps | | |
|---|---|---|---|---|---|---|---|---|
| | | | | Biref. | Percent Cryst. | 90° C. Water, percent | 100° C. Water percent | 200° C. Air, percent |
| 1 | 2.80 | 0.1902 | 38.3 | 0.1020 | 31 | 9.3 | 11.6 | |
| 2 | 2.31 | 0.1880 | 39.5 | 0.1150 | 25 | 5.4 | 7.7 | |
| 3 | 2.103 | 0.1852 | 40.8 | 0.1076 | 27 | 3.1 | 4.0 | |
| 4 | 2.937 | 0.2025 | 51.0 | | 23 | | 17.1 | 25.3 |
| 5 | 2.937 | 0.2025 | 37.8 | | 44 | | 0.0 | 6.9 | drawn yarn is passed through the hollow needle and the nozzle described above to a suitable wind-up package. The air is maintained at 265° C. and 5 p.s.i. on the entrance side of the nozzle. The yarn is passed into the nozzle at 608 yds./min. and wound up at 450 yds./min., corresponding to a shrinkage of 26% and an exposure time of 0.005 second, based on the rate of withdrawal of the yarn from the nozzle. The heat-treated yarn has a birefringence of 0.1533 and a crystallinity level of 47%. Samples of the yarn undergo spontaneous extension in length amounting to 1.7% and 2.5% when they are heated in water at 90° C. and 100° C., respectively (5 minute exposures).

*Example 5*

A strip of unoriented, substantially amorphous polyethylene terephthalate film 0.5 inch wide and 1 mil thick is drawn by hand in the longitudinal direction at a draw ratio of 3.0 while the film is immersed in water. The drawn film is allowed to dry and is then immersed for 5 minutes in silicone oil at 87° C., resulting in a shrinkage of 27% in the longitudinal direction of the film. (The silicone oil is identified as "DC-200," Dow-Corning Corp.) The heat-treated film undergoes spontaneous extension in length amounting to 1.05% when it is heated in water at 90° C. (5 minute exposure).

Another length of the drawn film is dipped in water at 100° C. for a contact time approximating 0.1 second, resulting in a shrinkage of 32.5% in the longitudinal direction of the film. Subsequently the film undergoes a spontaneous extension in length amounting to 4.0% when it is heated in water at 90° C.

*Example 6*

A polyethylene terephthalate/isophthalate (90/10) copolyester having an intrinsic viscosity of 0.64 is spun at 295° C. through a spinneret having 34 orifices, each 0.009 inch in diameter, and the yarn is wound up at a speed of 1206 yds./min. The yarn has a denier of 135 as spun and is substantially amorphous and relatively unoriented. The spun yarn is passed from a supply package through a bath of water at 25° C. and over a sponge to leave a thin uniform film of water on the yarn, after which it is passed around a feed roll, around a draw pin 1.6 inches in diameter maintained at a temperature of 100° C., and then around a draw roll, finally being wound up on a suitable package. The speed at the draw roll is 545 yds./min. and the draw ratio is 3.113. The drawn yarn is oriented but still substantially amorphous. The drawn yarn is then immersed in 100° C. water for an exposure time approximating 0.1 second, resulting in a shrinkage of 42.6%. The resulting yarn product, when heated in 100° C. water for 5 minutes, undergoes a spontaneous extension in length of 10.3%.

A polyethylene terephthalate/isophthalate (94/6) copolyester having an intrinsic viscosity of 0.60 is spun at 295° C. through a spinneret having 17 orifices, each 0.009 inch in diameter, and the yarn is wound up at a speed of 1206 yds./min. The spun yarn is drawn as described above, except that the draw ratio is 3.165 instead of 3.113. The drawn yarn is oriented but still substantially amorphous. The drawn yarn is then immersed in 100° C. water for an exposure time approximating 0.1 second, resulting in a shrinkage of 56%. The resulting yarn product, when heated in 100° C. water for 5 minutes, undergoes a spontaneous extension in length of 20%.

A polyethylene terephthalate/5-(sodium sulfo)isophthalate (98/2) copolyester having an intrinsic viscosity of 0.50 is prepared by a condensation reaction between 2.1 mols of ethylene glycol and a mixture of 0.98 mol of dimethyl terephthalate and 0.02 mol of sodium 3,5-dicarbomethoxybenzenesulfonate. The copolyester is spun at 295° C. through a spinneret having 34 orifices, each 0.009 inch in diameter, and the yarn is wound up at a speed of 1206 yds./min. The yarn has a denier of 150 as spun and is substantially amorphous and unoriented. The spun yarn is then drawn as described above, the draw ratio being 2.937. The drawn yarn is oriented but still substantially amorphous. The drawn yarn is then immersed in 100° C. water for an exposure time approximating 0.1 second, resulting in a shrinkage of 55%. The resulting yarn product, when heated in 100° C. water for 5 minutes, undergoes a spontaneous extension in length of 16.7%.

*Example 7*

To 97 parts (0.5 mole) of dimethyl terephthalate and 151 parts of trans-p-hexahydroxylylene glycol (1.05 moles) is added 0.02 part of tetraisopropyl titanate, and the mixture is heated with evolution of methanol until no more methanol is obtained. The mixture is then placed in a tube and heated at 280° C. at a pressure of 0.4 mm. of mercury for 3 hours, with evolution of the glycol. The resulting poly(trans-p-hexahydroxylylene terephthalate) is found to have an intrinsic viscosity of 0.65. It is spun at 291° C. through a spinneret having five orifices, each 0.007 inch in diameter, and the yarn is wound up at a speed of 56 yds./min. The yarn has a denier of 130 as spun and is substantially amorphous and relatively unoriented. The spun yarn is then drawn by hand at a draw ratio of 2.4 over a hot plate maintained at 90° C. The resulting yarn is oriented but still substantially amorphous. The drawn yarn is then dipped in water at 100° C. for 5 seconds, resulting in a shrinkage of 48.5%. Samples of the heat-treated yarn subsequently undergo spontaneous and irreversible extension in length amounting to 7.1%, 11.0%, and 17.8% when they are exposed to 90° C. water for 7 minutes, 100° C. water for 5 minutes, and 190° C. air for 15 minutes, respectively. Another sample of the spun yarn is drawn by hand at a draw ratio of 2.3 over a hot plate maintained at 90° C., following which the yarn is dipped in water at 100° C. for 5 seconds, resulting in a shrinkage of 47.2%. Samples of the heat-treated yarn subsequently undergo spontaneous and irreversible extension in length amounting to 1.6%, 7.5%, and 12.4% when they are exposed to 90° C. water for 7 minutes, 100° C. water for 5 minutes, and 190° C. air for 15 minutes, respectively.

In another experiment, 151 parts of trans-p-hexahydroxylylene glycol are reacted with 95 parts of dimethyl terephthalate and 2.97 parts of sodium 3,5-dicarbomethoxybenzenesulfonate, in the presence of 0.02 part of tetraisopropyl titanate, following the general procedure outlined above, to prepare a copolyester having an intrinsic viscosity of 0.51. The copolyester is spun into 5-filament, 220-denier yarn in the manner described above. The spun yarn is drawn by hand at a draw ratio of 2.0 over a hot plate maintained at 88° C., following which the yarn is dipped in water at 100° C. for 5 seconds, resulting in a shrinkage of 40.3%. Samples of the heat-treated yarn subsequently undergo spontaneous and irreversible extension in length amounting to 2.3%, 4.7%, and 6.4% when they are exposed to 90° C. water (7 minutes), 100° C. water (5 minutes), and 170° C. air (15 minutes), respectively. Another sample of the spun yarn, when drawn at a draw ratio of 1.97 by hand over a hot plate maintained at 93° C., shrinks 43.2% when dipped in 100° C. water for 5 seconds. Samples of the heat-treated yarn subsequently undergo spontaneous and irreversible extension in length amounting to 5.0%, 9.4%, and 10.8% when exposed to 90° C. water (7 minutes), 100° C. water (5 minutes), and 190° C. air (15 minutes), respectively.

It will be apparent that many widely different embodiments of this invention may be made without departing from the spirit and scope thereof, and therefore it is not intended to be limited except as indicated in the appended claims.

We claim:

1. In the process in which a spontaneously extensible linear terephthalate polyester structure is heated at a temperature above 70° C. to produce an increase in crystallinity and a spontaneous and irreversible extension in length of said polyester structure, the improvement which comprises further increasing the crystallinity and length of said polyester structure by heating it a second time at a temperature above 70° C.

2. The process of claim 1 in which the second-heating temperature is higher than the first-heating temperature.

References Cited in the file of this patent

UNITED STATES PATENTS

| | | |
|---|---|---|
| 2,373,215 | Young | Apr. 10, 1945 |
| 2,377,928 | Fielitz et al. | June 12, 1945 |
| 2,604,689 | Hebeler | July 29, 1952 |
| 2,734,794 | Calton | Feb. 14, 1956 |